Nov. 25, 1941.  R. W. MAY  2,264,181

LIQUID METER

Filed Oct. 16, 1940

INVENTOR.

BY Richard W. May.
Walter C. Ross. Attorney.

Patented Nov. 25, 1941

2,264,181

UNITED STATES PATENT OFFICE 2,264,181

LIQUID METER

Richard W. May, Troy, N. Y.

Application October 16, 1940, Serial No. 361,436

2 Claims. (Cl. 73—215)

My invention relates to improvements in an apparatus for measuring and indicating or recording the flow of fluids.

The principal objects of the invention are directed to the provision of a novel apparatus for measuring or indicating the flow of liquids adapted and arranged to operate accordingly as the head of a flowing liquid varies so as to indicate or to record the flow of the same.

The novel features of the invention are adapted for broad application and various changes and modifications may be made in the form thereof without departing from the spirit and scope of the invention.

The invention in the form at present preferred is set forth in the following description wherein the novel advantages and objects of the invention will be observed.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawing wherein:

Figure 2:
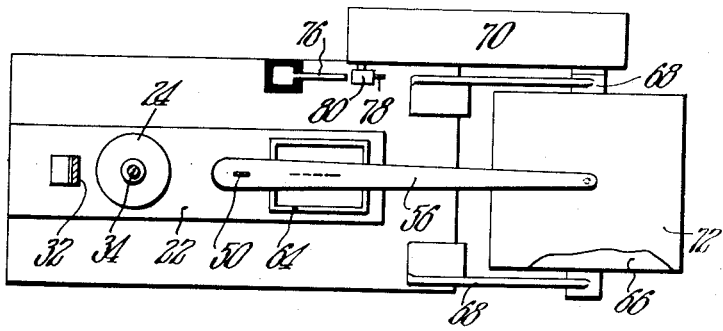
Fig. 2 is a sectional plan view on the line 2—2 of Fig. 1.
Figure 1:
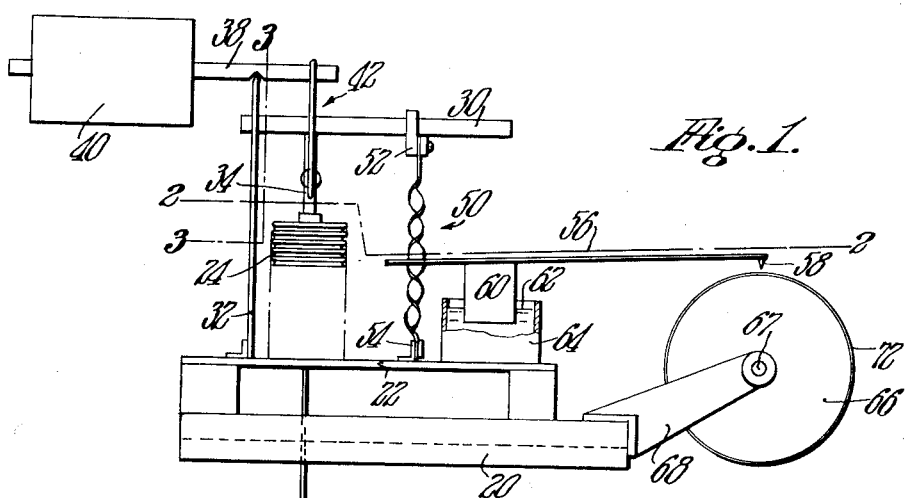
Fig. 1 is a side elevational view of an apparatus embodying the novel features of my invention shown in association with a flume which is shown in cross section.
Figure 3:
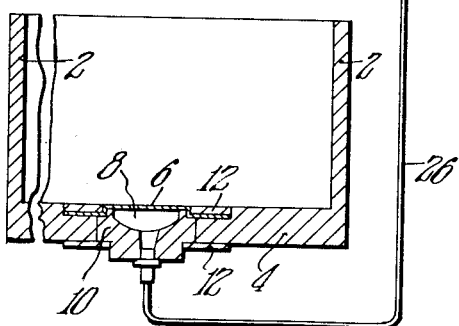
Fig. 3 is a sectional elevational view on the line 3—3 of Fig. 1.
Figure 4:
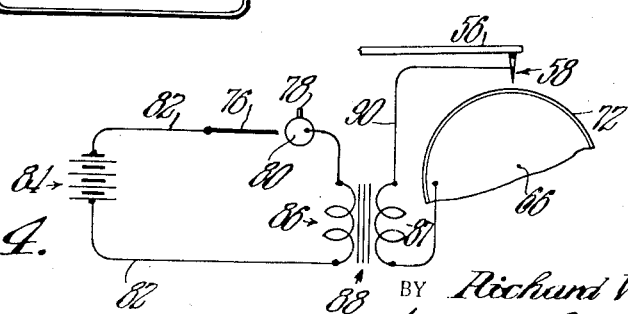
Fig. 4 is a wiring diagram intended to explain certain features of my invention.

Referring now to the drawing more in detail, wherein similar reference figures refer to like parts, and referring more particularly to the preferred form of my invention which has been selected for illustrative purposes, I have shown in Fig. 1 side and lower walls 2 and 4 of a flume through which the liquid may flow. According to the invention, with the dimensions of the flume being known or the essential dimension being known with the velocity of flow of the liquid, it is possible to indicate or to record the volume of flow according to the head of the flowing liquid or pressure thereof on a diaphragm of the apparatus.

In the lower wall 4 of the flume, a diaphragm 6 is disposed over a chamber 8 of a member 10 which is associated with said wall 4. The diaphragm 6 is preferably arranged to be disposed substantially flush with said lower wall 4, substantially as shw w1 in Fig. 1. The diaphragm 6, the member 10, and the bottom wall 4 are all secured together by means of rings such as 12.

The liquid flowing through the flume passes over the diaphragm so as to act thereon. A greater head of liquid exerts a greater force on the diaphragm than a lesser head, and my invention contemplates means for indicating the variations or changes in the head so as to indicate or to record the flow. Other means than that which are to be described may be employed if it is so desired.

A support or base 20 has a table 22 associated therewith and on the upper side thereof is a "Sylphon" 24 which is connected by a conduit 26 to the chamber 8. The chamber, "Sylphon" and conduit all provide a closed system for a fluid so that as the diaphragm 6 is depressed by a liquid in the flume, the "Sylphon" is caused to distend. A lesser head of liquid in the conduit allows the "Sylphon" to contract. That is to say, the "Sylphon" distends and contracts accordingly as the head of flowing fluid in the flume varies.

A bar 30 has one end pivotally connected to an upright 32 as by a knife edge connection and a member 34 on the upper side of the "Sylphon" engages the said bar 30. As the upper side of the "Sylphon" moves up and down, the bar 30 is moved up and down accordingly upon its connection with the upright member 32.

An upper bar 38 is pivoted on the upper end of the upright member 32 and it has a weight 40 which is slidable therealong. The forward end of the bar 38 is connected to the member 34 of the "Sylphon" 24 by a connection 42 substantially as shown in Fig. 1.

The connection 42 includes an inverted U shaped member having an upper part 44 resting on the bar 38 and side arm parts 46 having lower more or less spear-like ends which are disposed in sockets of a member 48 on the part 34. The weight 40, the bar 38 and the connection 42 function as a balance for member 30.

A relatively thin flat member 50 has its upper end clamped to a member 52, which member is carried by the bar 30. The lower end of member 50 is clamped to a bracket 54 which is carried by member 22. This member 50 has secured to an intermediate portion thereof, an outwardly extending member 56 on the end of which is a relatively sharp point 58.

The member 50 is twisted above and below the co-operating member 56 so that as the bar 30 moves up and down, the member 56 is caused to swing back and forth. As the bar 30 moves upwardly, by reason of an increase in the head of liquid in the flume, the member 56 swings in one direction. As the bar 30 moves downwardly, as when there is a less head of liquid in the flume, the member 56 swings in an opposite direction.

A vane preferably of some thin material 60 is disposed on the lower side of the member 56 and is arranged to be at least partly submerged in a liquid 62 in a receptacle 64. This acts to dampen the movements of the member 56.

A metallic drum 66 has a shaft 67 rotatable in bearing brackets 68. The shaft 67 is operatively connected to some suitable operating means such as a clock motor which is indicated generally by 70. The motor is arranged to rotate the drum.

The drum carries on its periphery a sensitized sheet 72. As the drum 66 and the pointer 58 are energized or are connected in an electrical circuit so as to create a spark, said spark acts on and marks the sensitized sheet 72.

A contact member 76 which is suitably insulated is engaged by a member 78 of a rotator 80 which is driven by the clock motor 70. The drum 66 may be rotated at any desired speed and the member 80 may be driven at such a speed as will cause to send any desired member of impulses to the pointer per revolution of the drum.

In one way, the members 76 and 80 may be connected by 82 in series with a source of energy, such as a battery 84, and the primary 86 of a transformer or spark coil 88. The pointer 58 and the drum 66 may be connected by connections 90 to the secondary 87 of the unit 88.

Other means may be employed for recording or indicating the movements or positions of the member 56.

In operation, the diaphragm 6 is acted upon by the head of the flowing liquid so that the fluid in the system causes the "Sylphon" to actuate the member 56 whereby its free end traverses the sheet on the drum. As the drum rotates a spark is intermittently created which marks the sheet. Thus the sheet provides a record of the position of the pointer at each moment of sparking. The sheet 72 may be arranged to indicate visually the flow and the variations of flow over such a period of time as the sheet may be arranged for, whereby it will be possible to determine the flow for any given time.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. The combination of an open flume for flowing liquid provided with a bottom wall having an opening with means for indicating the flow of liquid through said flume comprising, a receptacle member having an open upper side secured to said bottom wall in said opening, a hollow extensible member and an indicating means operable by extension thereof, a conduit connecting said receptacle member and extensible member, and a flexible diaphragm over said opening closing said receptacle member and providing a closed system for fluid including the receptacle member, extensible member and conduit and forming a continuation of the bottom wall of the flume and supporting liquid in the flume over the fluid in said system.

2. The combination of an open flume for flowing liquid provided with a bottom wall having an opening with means for indicating the flow of liquid through said flume comprising, a receptacle carried by said bottom wall and having an open upper side in said opening, a hollow closed extensible member and indicating means operably connected thereto, a conduit connecting said receptacle and hollow member, a flexible diaphragm overlying the open upper side of the receptacle forming a continuation of said bottom wall and a closure for said receptacle providing a fluid chamber therebelow in communication with the extensible member whereby liquid flowing in the flume is supported through the diaphragm by the fluid in the chamber, said indicating means including, a support, a movable member spaced therefrom movable by the extensible member and a relatively thin twisted member extending between said support and movable member having a pointer secured thereto intermediate the ends thereof.

RICHARD W. MAY.